Patented Sept. 18, 1951

2,568,331

UNITED STATES PATENT OFFICE 2,568,331

COPOLYMERIZATION OF STYRENE AND UNSATURATED POLYESTER

Vincent J. Frilette, New York, N. Y.

No Drawing. Application June 26, 1947, Serial No. 757,327

6 Claims. (Cl. 260—40)

The present invention relates specifically to improvements in the processes and methods for obtaining laminated and cast products from alkyd styrene copolymers.

It is an object of this invention to provide a means for laminating and casting plastic objects from alkyd styrene copolymers, wherein the application of external heating and other cumbersome, difficult and time-consuming procedures are eliminated.

It is a further object of this invention to provide a means for casting plastic objects without requiring the external application of heat and to take advantage of the rise in temperature which is inherent in this process wherein there occurs a reaction commonly termed "an exothermic reaction."

It is a further object of this invention to provide means permitting the full and complete use of all the internal heat formed and created during the exothermic reaction.

It is a further object of this invention to provide means for the complete and equal distribution of the exothermic heat created during said reaction.

It is a further object of this invention to provide a method permitting the casting of large sized objects and eliminating from such casting procedures the difficulties encountered when the application of external heat is required.

It has long been a problem in the art to fully utilize the exothermic heat peculiar to an exothermic reaction in the manufacture, casting and use of highpolymers wherein an exothermic reaction is characteristic of said highpolymers. When large objects are cast from highpolymeric resins, frequently the application of constant and high temperatures, evenly to all and every part of the mold and to the inner core of the resin, has been a considerable problem.

In the invention set forth herein below, it is now shown that it is possible to manufacture such large castings without requiring the application of external heat.

As is well known in the art, liquid alkyd styrene mixtures may be used in combination with a catalyst such as benzoyl peroxide for the purpose of lamination and casting; wherein to convert the liquid resin to a solid state the heat application of from 70° to 120° C., is required. Furthermore, these castings frequently require heating periods of long duration so as to allow the dissipation of the exothermic heat through the means of the endothermic heat application.

I have observed that by combining the liquid alkyd styrene copolymer with a catalyst such as an organic peroxide and in combination therewith a compound of the group of alkaline earth metals such as metal oxides and hydroxides in the class and group IIA of the periodic table, that the liquid alkyd styrene mixture may be converted into its solid polymers without requiring the external application of heat. It has further been observed that by combining the liquid styrene copolymer with a catalyst such as an organic peroxide and in combination therewith either ammonia or a complex amine such as one of the ethylene polyamines that in this manner the liquid alkyd styrene mixture may be converted into its solid polymer without requiring the application of external heat.

While it is well known that metallic oxides promote esterification, it has not been taught in the prior art that these substances promote catalytically or otherwise polymerization. It is furthermore to be noted that the metallic oxides are quite inert and not very reactive.

As is well known in the art, alkyd styrene mixtures can be produced which will not thermo set or gel for several months, if they are kept at room temperature; their usefulness arises from the fact that they may, however, be converted into a solid form by the addition of an organic peroxide catalyst and subsequent heat treatment at elevated temperatures. This heat treatment, an absolute necessity for realizing the practical solidification of the liquid resin, requires ovens, autoclaves, or other costly and cumbersome appliances, and has seriously limited the application of these resins in the past. Occasionally, as with very thin laminates, very high temperatures, such as 140° C. may be used to solidify the resin in a matter of minutes; but more generally, as hereinabove indicated, long time periods are required to allow for the dissipation of the exothermic heat.

The liquid alkyd styrene mixtures may now be converted into their solid form very rapidly by means of addition of a catalyst mixture, as shown in this invention, wherein no application of heat is required, and, furthermore, the setting period is considerably reduced.

The peroxides utilized in this invention consist of a group of organic peroxides utilized for the polymerization of unsaturated compounds. Specifically, compounds of the group comprising benzoyl-peroxides, lauryl-peroxides and acetyl-peroxides, in quantities from 0.5 to 5% are required for a satisfactory conversion of the liquid alkyd styrene mixture into its solid polymer. The percentages of catalyst required vary, depending on the particular alkyd used. The large quantities of peroxides, viz., from 2% to 5%, are required by alkyds containing only small quantities of either maleic or fumaric acid, while 1% to 3% may be sufficient in those alkyds which contain only a single acid of the group of polycarboxylic acids, such as maleic acid. The preferable procedure recommended is to dissolve first the peroxide prior to the introduction of the insoluble oxides or hydroxides. In case ammonia or ethylene-diamine is used, local gellation may occur upon the introduction of either the ammonia or the ethylene diamine into the liquid alkyd styrene mixture. This disadvantage may be avoided by first adding the amine or ethylene diamine and adding the peroxide catalyst subsequent thereto.

As has been pointed out hereinabove, the particular improvement set forth in this process resides in the combination of a catalyst, together with an oxide or hydroxide of the group IIA of the periodic table. The oxides and hydroxides may be used in varying quantities and there is no narrow limit for the use of these oxides and hydroxides in combination with the customary catalyst.

As the oxides or hydroxides of the group IIA of the periodic table are all insoluble compounds, the final solid high polymer product is always rendered at least slightly translucent and in some cases the end product may be completely opaque. It is well understood that the reactivity of the oxides and hydroxides proposed for use in the present invention, varies considerably. It is preferred to use the oxides and hydroxides in such manner that they are finely comminuted; it being understood, however, that even lumps and coarse material will be effective in producing the desired results. As is well understood, the purity of the oxides and hydroxides is also of importance, and materials of this group containing large quantities of impurities and, in particular, sulfur, will greatly retard the process and slow down the setting of the liquid polymer into the solid polymer.

It has been observed that the metallic components of the required oxides and hydroxides of group IIA of the periodic table, will influence the speed of the reaction. Thus, for instance, it has been observed that calcium hydroxide is most reactive and may be used in small amounts, such as in quantities from 0.5% to 5% of the total weight of the alkyd-styrene mixture, whereas the magnesium oxide is required in large quantities such as from 5% to 50% of the weight of the alkyd-styrene resin.

In case the less-reactive hydroxides or oxides are used, it is possible to use up to the "loading limit," i. e., about equal proportions of the oxide and hydroxide and of the resin may be used.

Magnesium, strontium and barium are about equally as effective in this process. It is, however, to be pointed out that magnesium, strontium and barium oxides and hydroxides are less effective than are their weight equivalents in calcium oxide or hydroxide. The preferred procedure is to use from 5% up to the "loading limit," i. e., about equal weight of oxide or hydroxide and the equivalent weight in resin.

With reference to ammonia and ethylene diamine, which have been found to exert the same effect as the oxides and hydroxides of group IIA of the periodic table, much smaller amounts of ammonia and ethylene diamine are required to obtain the desired effect, which is the same effect as that obtained by means of use of compounds of the group comprising oxides and hydroxides of group IIA of the periodic table. This result may well be due to the fact that ammonia and ethylene diamine are soluble and thus disperse without difficulty immediately throughout the entire high polymer body without requiring it to be put into solution.

The oxides and hydroxides, as pointed out hereinbefore, are naturally insoluble and their diffusion in the resin may rather be considered to be a dispersion.

It has been observed that from 0.09% to 5.0% of ammonia or ethylene diamine are sufficient to cause the desired result—solidifying the high-polymer body at room temperature.

Having now reference to the alkyd styrene polymers specifically satisfactory in this process, it is to be pointed out that alkyds of the common construction comprising therein dihydric alcohols, such as diethyleneglycol and dibasic unsaturated acid, such as itaconic, citraconic, maleic and fumaric acid, are satisfactory. It is naturally understood that the anhydrides of these dibasic unsaturated acids are also operable in this procedure.

Having now reference to the catalysts, it has been found that all the catalysts commonly used in these processes in combination with externally applied heat are operable in this particular application, when these catalysts are combined with either the oxides or hydroxides of group IIA of the periodic table; or with ammonia or ethylene diamine, respectively.

With reference to the combination of the compounds in the operative process, it has been found most satisfactory to introduce into the alkyd-styrene polymer mixture, first, the amine and, subsequent thereto, the peroxide-catalyst; and in reverse, with the operative group of oxides and hydroxides of group IIA of the periodic table, it has been found most satisfactory to introduce into the alkyd-styrene mixture, first, the peroxide and, subsequently thereto, the metallic oxide or hydroxide.

As pointed out hereinabove, the alkyd resins useful in the process set forth hereinbelow are prepared be esterifying dibasic unsaturated acids, characterized by a double bond, being adjacent to the carboxyl group. As the alcoholic component, the low molecular weight glycols such as ethylene glycol, diethylene glycol, triethylene glycol, propylene glycol and butylene glycol are satisfactory. The esterification is best carried out by heating at about 200° C. substantially equi-molar quantities of the dibasic unsaturated acid and the glycol, until sufficient water has been evolved to indicate that a 1.20 ester linkage per acid residue has been obtained. The upper limit of the water evolution can be calculated by considering the extent of "oxygen contact" of the mixture, i. e., the more specific and definite the oxygen exclusion, the more water can be evolved without causing gellation.

It is well known in the art that by the introduction of oxygen, a rapid gellation is induced. The introduction of oxygen into the common alkyd mixtures during their nascence will cause a rapid gellation.

It is, therefore, a preferable procedure in this process to employ, during the alkyd formation, a three-neck flask, having attached thereto a stirrer; and to introduce a nitrogen or carbon-dioxide stream which continuously will blanket the resin surface and occupy the total available space in the three-neck flask.

The alkyd resins may be modified in this process by substituting saturated dibasic acids, aromatic dibasic acid, or their anhydrides, in part for the unsaturated dibasic acid. This modification, however, usually results in a considerably lower reactivity of the resin; the end-products in this case tending to be less brittle. It is not desirable in this process to extend the modification of the alkyd resin up to a proportional ratio of 1.1 molar equivalent of saturated or aromatic dibasic acid to the unsaturated dibasic acid. The criterion determining the desirable extent of esterification remains the same, whether the alkyd resin be modified by the partial substitution of the saturated or aromatic dibasic acids, or their anhydrides in the unsaturated dibasic acid. The preferred procedure in this process is to carry the esterification on up to the point where at least 1.20 ester linkages have been formed per average maleic-anhydride molecule, assuming that the same extent of esterification covers both the acids involved.

After the alkyd has been formed, it is cooled to below 100° C. and then from 5% to 70% of the styrene monomer (this percentage being based on the weight of the alkyd) is added. No more of the styrene monomer than an amount that will form a clear solution with the alkyd should be added. The tolerance of the alkyd for the styrene monomer depends on its emposition and the degree of esterification which has occurred in the alkyd. The styrene serves to increase the reactivity of the alkyd when the styrene is used in accordance with the desired proportions and quantities set forth herein, as preferred. The styrene will decrease the viscosity of the alkyd so as to make the total mixture more amenable for use in impregnation and mold-pouring. With some of the more sensitive alkyd compositions, it is desirable to add a trace of inhibitor so as to prevent gellation from occurring during the manipulation.

For purposes of exemplification, however not limiting the scope of the invention set forth herein, the following examples are given:

Example 1

To 196 grams (2 mols) of maleic anhydride were added 212 (2 mols) of diethylene-glycol. The mixture was heated by an electric mantle up to 100° C., when an exothermic reaction set in. The heat was shut off until the temperature reached 170° C. At this point, the mixture appeared as a thin liquid. A stopper, fitted with a thermometer, a gas inlet tube and a simple delivery tube, were inserted. A slow stream of nitrogen was passed through the flask, and the heat turned on again. The temperature was raised to 200° C., and was maintained at 200°–210° for three hours while passing nitrogen through the flask continuously. At three hours, 26 grams of water had been collected, and the alkyd was allowed to cool to about 50° C. The flask was weighed and was found to have lost 28 grams in weight. Twenty milligrams of hydroquinone were added, followed by 50 grams of styrene monomer. When cooled to room temperature, the alkyd styrene mixture was a clear homogeneous, light yellow colored liquid which was slightly viscous. To 200 grams of the alkyd styrene mixture were added and dissolved, 4 grams of benzoyl peroxide, which acted as catalyst for the resin mix, and the material thereafter formed a solid highpolymer. Thirty grams of this mix were retained as control. They remained fluid for two days and thereafter formed a soft jelly.

To 30 grams of the catalysed mix were added 20 grams of powdered magnesium oxide, in the form of a commercially available calcined magnesite. The dispersion remained fluid for four hours. After the four-hour period, the catalysed mix containing the magnesium oxide evolved exothermic heat and then thickened rapidly into a gel. This gel was found to be completely hardened after a five-hour period, after which the hard, solid casting was obtained.

Example 2

To 30 grams of the catalysed mix, obtained in the same manner as in Example 1, 20 grams of calcium oxide were added. The dispersion remained fluid for 90 minutes, then rapidly evolved exothermic heat and hardened into a solid.

Example 3

To 30 grams of the catalysed mix, obtained by reacting 2 mols of diethylene-glycol to 2 mols of maleic anhydride, and introducing into that mixture a catalyst of the common organic peroxide type, and adding thereto styrene monomer, 20 grams of powdered strontium oxide. The dispersion immediately started to evolve exothermic heat and formed a gel within a period of ten minutes. The gel was completely hardened at the end of four hours.

Example 4

To 30 grams of the catalysed mix of Example 1 were added 20 grams of barium oxide in the form of small lumps. The lumps rapidly settled out in a layer, leaving the supernatant liquid turbid. On the bottom of the beaker, an exothermic reaction occurred and a hard layer was formed within a half hour. Within the next hour, the turbid supernatant liquid jelled and hardened.

Example 5

To 30 grams of the catalysed mix of Example 1, 20 grams of U. S. P. calcium hydroxide were added. The dispersion immediately began to thicken and the thickened solution was troweled onto a glass plate and covered with cellophane. A tough, flexible gel formed which did not adhere to the glass. It soon hardened into a rigid sheet.

Example 6

To 30 grams of the catalysed mix of Example 1, 0.7 ml. C. P. ammonium hydroxide con. were added. The mass progressively hardened and a clear, light yellow solid was obtained after a few hours.

Example 7

To 112.5 grams of maleic anhydride and 175 grams of diethylene-glycol, 54.7 grams of adipic acid were added. The mixture was then reacted as shown in Example 1 until 26 grams of water had been collected showing 1.7 ester groups per maleic anhydride residue. After cooling the mixture to 60° C., 0.03 grams of hydroquinone and 68 grams of styrene monomer were added. To 30 grams of the thus obtained alkyd styrene mix, 1 gram of aqueous ethylene diamine was added. Thus a slightly turbid solution was formed. One gram of lauroyl peroxide was then introduced into the solution. After two hours, the mixture became exothermic and set into a hard opalescent mass.

Example 8

To 74 grams of maleic anhydride, 111 grams of phthallic anhydride were added. Thereafter, 110 grams of ethylene glycol were added. The esterification was carried out as shown in Example 1 until 20 grams of water were collected, yielding 1.7 ester groups of maleic anhydride residue. The alkyd was then cooled down to room temperature.

To 70 grams of this alkyd were added 30 grams of the styrene monomer and 1 gram of aqueous ethylene diamine (67% solution). This was catalyzed by the introduction of 2.5% grams of benzoyl peroxide. After 45 minutes, the clear mix became exothermic and set as a solid, dry gel. The material was flexible and free from stickiness, with the exception of its air-exposed surfaces.

Example 9

One mole of maleic acid and one mole of diethylene-glycol were heated in an open beaker until an exothermic reaction set in, when the gas burner was turned off. The temperature automatically rose from 100° C. to 170° C. The burner was then turned on and the mixture held at 170°–190° C. for fifteen minutese to drive off some water. The product was then cooled to room temperature. This is an example of a very low degree of esterification wherein very little water is driven off. Note that more than 5% CaO is used.

To 100 grams of the cooled alkyd were added 10 grams of styrene monomer; a slightly turbid mixture formed. Two grams of benzoyl peroxide were dissolved in the mix, followed by 50 grams of calcium oxide. In a half hour, a vigorous reaction set in, the beaker became too hot to hold and the mass quickly set to a hard, brittle solid.

Example 10

To 116 grams of fumaric acid were added 106 grams of diethylene-glycol. The mixture was esterified by raising the temperature to 200° C. under an N2 blanket, until 30 grams of water were collected. This required about two and one-half hours. An esterification of 1.65 ester groups per fumaric acid residue is obtained.

The alkyd was cooled to 50° C. and 10 milligrams of hydroquinone were added, followed by 60 grams of styrene monomer. Ten grams of Luperco A. T. P. (50% benzoyl peroxide, 50% triphenyl phosphate) were dissolved, and 60 grams of calcined magnesite were then stirred in. The dispersion was coated onto a glass cloth, and then laid in a female mold with the aid of a brush. In five hours, the mold was opened, and a rigid laminated replica of the female mold was obtained.

The examples set forth hereinabove will demonstrate the effect of the oxides and hydroxides of class 2A of the periodic table upon the highpolymer.

Examples 1, 3 and 4 demonstrate the use of barium, magnesium and strontium oxides which are the heavy oxides and the least reactive members of their group.

An example for increased activity which is obtained by means of calcium oxide is demonstrated in Examples 2 and 5. Example 5 specifically shows the use of the corresponding calcium hydroxide indicating the small quantitative amount of calcium hydroxide required to effectively affect the reaction.

Examples 6 and 8 show the use of ammonia and amines as catalysts. The effect of ammonia and amines is the same as the effect shown by the metallic oxides. It is, however, pointed out that the advantage of the ammonia, the amines and their use as catalysts, resides in the easy dispersion which can be obtained through their use. This is naturally due to the fact that the amines and ammonia are liquid.

In Example 7, the use of amines in connection with adipic acid is demonstrated.

Example 9 is of interest because it demonstrates the use of calcium oxide in a highpolymer mix, having a low styrene content and a low degree of esterification, while Example 10 shows the use of triphenyl phosphate extended by benzoyl peroxide.

The variety of effects obtained by varying the ingredients applicable to the present invention, demonstrates the degree of variation which is permissible in the reactions.

Having set forth the invention, what I claim and desire to secure by Letters Patent, is:

1. The process of accelerating the conjoint polymerization of a mixture comprised of a dihydric alcohol polyester of an alpha-ethylenically unsaturated alpha-beta dicarboxylic acid and styrene by adding to the mixture an organic peroxide catalyst and a compound selected from the class consisting of the oxides and hydroxides of magnesium, calcium, strontium and barium, said compound being added in an amount effective to accelerate the conjoint polymerization without the application of external heat.

2. The process according to claim 1 wherein said compound is magnesium oxide.

3. The process according to claim 1 wherein said compound is calcium oxide.

4. The process according to claim 1 wherein said compound is calcium hydroxide.

5. The process according to claim 1 wherein said compound is barium oxide.

6. The process according to claim 1 wherein said compound is barium hydroxide.

VINCENT J. FRILETTE.

REFERENCES CITED

The following references are of record in the file of this patent:

UNITED STATES PATENTS

| Number | Name | Date |
|---|---|---|
| 2,252,271 | Mathis | Aug. 12, 1941 |
| 2,255,313 | Ellis | Sept. 9, 1941 |
| 2,288,321 | Nordlander et al. | June 30, 1942 |
| 2,305,224 | Patterson | Dec. 15, 1942 |
| 2,361,019 | Gerhart | Oct. 24, 1944 |
| 2,406,298 | King | Aug. 20, 1946 |
| 2,429,060 | Hoover | Oct. 14, 1947 |
| 2,450,552 | Hurdis | Oct. 5, 1948 |
| 2,462,042 | Howald et al. | Feb. 15, 1949 |
| 2,549,732 | Weaver | Apr. 17, 1951 |

OTHER REFERENCES

Rust; pages 64–67, Ind. & Eng. Chem., January 1940.